(12) United States Patent
Gradu et al.

(10) Patent No.: US 7,699,405 B2
(45) Date of Patent: Apr. 20, 2010

(54) VEHICLE WHEEL END ASSEMBLIES AND METHODS OF ASSEMBLY THEREOF

(75) Inventors: Mircea Gradu, Massillon, OH (US);
Scott A Warren, Dover, OH (US);
Steven A Roman, North Canton, OH (US)

(73) Assignee: The Timken Company, Canton, OH (US)

( * ) Notice: Subject to any disclaimer, the term of this patent is extended or adjusted under 35 U.S.C. 154(b) by 188 days.

(21) Appl. No.: 11/844,801

(22) Filed: Aug. 24, 2007

(65) Prior Publication Data
US 2009/0051214 A1 Feb. 26, 2009

(51) Int. Cl.
*B60B 27/00* (2006.01)

(52) U.S. Cl. ............... 301/105.1; 301/137; 384/544; 384/589

(58) Field of Classification Search ........ 301/105.1, 301/124.1, 126, 131, 132, 137; 384/544, 384/589
See application file for complete search history.

(56) References Cited

U.S. PATENT DOCUMENTS

| | | | | |
|---|---|---|---|---|
| 1,819,110 A | * | 8/1931 | Moorhouse | 301/126 |
| 2,087,684 A | * | 7/1937 | Alessi-Grimaldi | 301/1 |
| 2,107,073 A | * | 2/1938 | Herrington | 180/259 |
| 2,685,184 A | * | 8/1954 | De Nador et al. | 464/171 |
| 3,042,133 A | * | 7/1962 | Ordorica | 180/256 |
| 5,197,786 A | | 3/1993 | Eschenburg | |
| 5,536,075 A | * | 7/1996 | Bertetti | 301/105.1 |

(Continued)

FOREIGN PATENT DOCUMENTS

DE   203 079 57   5/2003

(Continued)

OTHER PUBLICATIONS

Written Opinion of the International Searching Authority, Form PCT/ISA/237, dated Nov. 11, 2008 (10 pages).

(Continued)

*Primary Examiner*—Russell D Stormer
(74) *Attorney, Agent, or Firm*—Polster, Lieder, Woodruff & Lucchesi, L.C.

(57) ABSTRACT

A wheel end assembly for a vehicle includes an axle tube and a housing secured to the end of the axle tube. A hub includes a drive flange located axially outward from the housing and a spindle projecting from the drive flange into the housing. The hub spindle has a substantially solid body with drive splines about an external surface of the spindle. Rolling elements are located between the hub spindle and the housing for enabling the hub to rotate about an axis. The hub includes an inner race defining an inner raceway located around and carried by the hub spindle for engagement with the rolling elements. An axle shaft is positioned within the axle tube and includes splines that are coupled to the external drive splines of the hub. The axle shaft includes a substantially hollow end positioned within the housing having the shaft splines positioned within an inner surface of the hollow end of the axle shaft. The hollow end is configured for receiving a portion of the hub for coupling the shaft splines with the drive splines of the hub for transferring torque from the axle shaft to the hub.

23 Claims, 4 Drawing Sheets

U.S. PATENT DOCUMENTS

| | | | |
|---|---|---|---|
| 5,553,927 | A | 9/1996 | Mastrangelo |
| 5,603,554 | A | 2/1997 | Monroe et al. |
| 6,022,275 | A * | 2/2000 | Bertetti .................. 464/178 |
| 6,093,127 | A | 7/2000 | DiDomenico et al. |
| 6,113,279 | A | 9/2000 | Sawai et al. |
| 6,196,639 | B1 | 3/2001 | Di Ponio et al. |
| 6,254,196 | B1 | 7/2001 | Gee |
| 6,336,747 | B1 | 1/2002 | Sawai et al. |
| 6,422,657 | B2 | 7/2002 | Di Ponio et al. |
| 6,524,011 | B2 | 2/2003 | Miyazaki et al. |
| 6,543,858 | B1 * | 4/2003 | Melton .................. 301/137 |
| 6,557,947 | B1 | 5/2003 | Hunt |
| 6,581,287 | B2 | 6/2003 | Sawai et al. |
| 6,581,288 | B1 | 6/2003 | Rybkoski et al. |
| 6,640,438 | B2 | 11/2003 | Webb et al. |
| 6,672,770 | B2 | 1/2004 | Miyazaki et al. |
| 6,688,773 | B2 | 2/2004 | Webb et al. |
| 6,702,474 | B2 | 3/2004 | Webb et al. |
| 6,761,486 | B2 | 7/2004 | Miyazaki et al. |
| 6,785,965 | B2 | 9/2004 | Sawai et al. |
| 6,886,987 | B2 | 5/2005 | Shevket et al. |
| 6,969,125 | B2 | 11/2005 | Wang et al. |

FOREIGN PATENT DOCUMENTS

| | | |
|---|---|---|
| DE | 10 2005 022 077 | 5/2005 |
| EP | 0 849 477 | 6/1998 |
| JP | 2 060 802 | 3/1990 |
| JP | 2 608 02 | 3/1990 |
| JP | 2 831 02 | 6/1990 |

OTHER PUBLICATIONS

International Search Report from the Internatioal Searching Authority, Form PCT/ISA/210, dated Nov. 11, 2008 (4 pages).

* cited by examiner

US 7,699,405 B2

VEHICLE WHEEL END ASSEMBLIES AND METHODS OF ASSEMBLY THEREOF

FIELD

The present disclosure relates to vehicle drive assemblies and, more specifically, to wheel end assemblies having an axle and a wheel hub.

BACKGROUND

The statements in this section merely provide background information related to the present disclosure and may not constitute prior art.

Automobiles and light trucks of current manufacture contain many components that are acquired in packaged form from outside suppliers. The packaged components reduce the time required to assemble automotive vehicles and further improve the quality of the vehicles by eliminating critical adjustments from the assembly line. So-called "wheel ends" represent one type of packaged component that has facilitated the assembly of automotive vehicles.

Traditionally, a solid rear axle shaft coupled a differential to a wheel end. The wheel end includes hub with a hollow spindle having an orifice with internal splines for receiving and mating with a splined-end of the axle shaft. The axle shaft includes a threaded end for receiving a nut to hold the wheel end onto the axle shaft and for supporting thrust loads. In these arrangements, the axle shaft must have a substantial size, strength and weight for supporting the transfer of torque as well as providing structural support to the wheel end. Consequently, the hub spindle must also have substantial diameter, size and weight.

Some automotive vehicles, particularly light trucks and sport utility vehicles, use solid rear axles of the semi-floating variety to transfer torque to the driving wheels for such vehicles. The typical semi-floating rear axle has axle tubes that are fastened to and extend from an axle center that contains differential gearing. The gearing drives two axle shafts that extend through the tubes and at their ends are provided with hubs to which road wheels are secured along with brake disks or drums. In such arrangements, a solid rear axle housed in an axle tube that is connected at one end to a differential and at the other end to a rear wheel end. A housing at the wheel end is bolted to the axle tube for providing thrust support in both directions. A solid axle shaft within the axle tube transfers rotational drive torque from the differential drive to a drive hub. As such, the axle shaft typically has a substantial diameter for ensuring the transfer of torque to the hub. The hub includes a hollow spindle that is mounted within the housing by antifriction bearings for providing near frictionless rotation of the hub within the housing. The hub has a driving flange on which a wheel is mounted. The spindle of the hub is hollow in that it includes a center hole or orifice having inner splines for receiving and engaging mating splines on the outside of an end of the axle shaft.

However, in current wheel end assemblies not only does the axle shaft have to have substantial diameter, but the spindle of the hub must have substantial diameter for receiving within its hollow body the axle shaft and for defining the internal splines for coupling to the axle shaft. As such, the antifriction bearings that surround the hub spindle to provide support to the spindle and the hub must also have substantial diameter. Consequently, the housing supporting the antifriction bearings must also have substantial diameter as required by the outer dimensions of the hollow spindle.

SUMMARY

The inventors hereof have identified the need for an improved wheel end assembly for a vehicle. Various aspects of the present disclosure will be in part apparent and in part pointed out below. It should be understood that various aspects of the disclosure may be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

It should be understood that throughout the drawings, corresponding reference numerals indicate like or corresponding parts and features.

DETAILED DESCRIPTION

Figure 1:
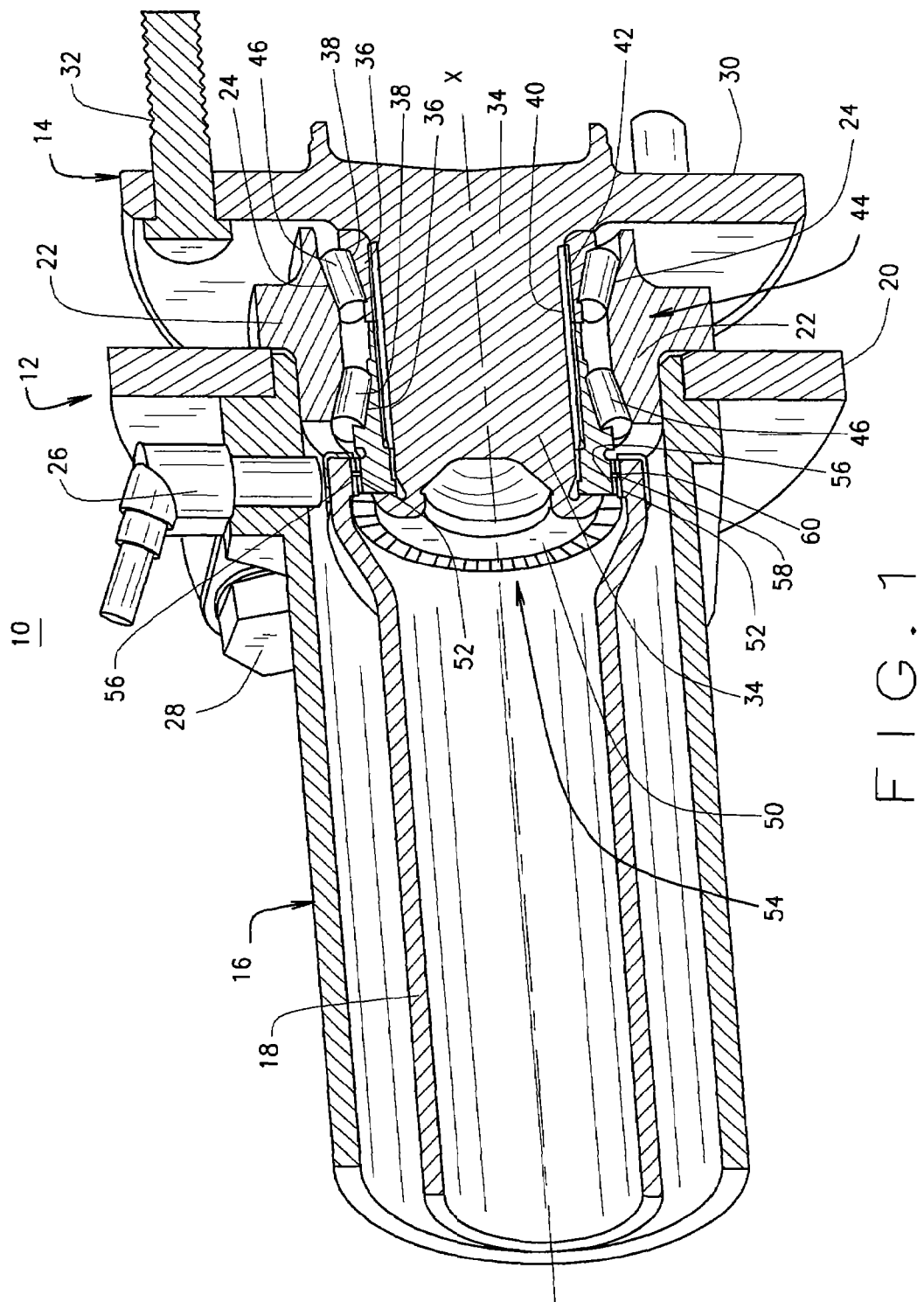
FIG. 1 is a cut away side perspective view of a wheel end assembly having a substantially hollow axle shaft according to one exemplary embodiment.

The following description is merely exemplary in nature and is not intended to limit the present disclosure or the disclosure's applications or uses.

Before turning to the figures and the various exemplary embodiments illustrated therein, a detailed overview of various embodiments and aspects is provided for purposes of breadth of scope, context, clarity, and completeness.

In some embodiments, a wheel end assembly for a vehicle includes an axle tube and a housing secured to the end of the axle tube. Generally, the hub can include an outer race defining an outer raceway for receiving and contacting a roller element such as a frictionless bearing. A hub includes a drive flange located axially outward from the housing and a spindle projecting from the drive flange into the housing. The hub spindle has a substantially solid body with drive splines about an external surface of the spindle. The hub can also include an inner race defining an inner raceway for receiving and contacting the roller element in conjunction with the outer raceway of the housing. For example, the hub spindle can include outer splines about a peripheral surface for coupling to inner splines of an inner race that is positioned about the hub spindle. The inner race and/or the inner race including the bearing assembly and possibly the housing, can be attached, such as by press fitting, to the hub spindle by engaging the splines about an inner surface of the inner race with the outer splines of the hub spindle. Additionally, in some embodiments, the hub spindle can includes a flange formed at an inboard end that is configured for securing the inner race to the hub spindle after it is installed thereon.

Rolling elements are located between the hub spindle and the housing for enabling the hub to rotate about an axis. These rolling elements can be of any type and can include, but are not limited to, various frictionless bearings including ball bearings, roller bearings, ball thrust bearings, roller thrust bearings, tapered roller bearings, and spherical roller bearings, by ways of example. The inner race, the outer race, and the roller elements, often referred to as a bearing assembly, provides for the relatively friction free rotation of the hub relative to the housing. The inner race can be attached to external splines of the spindle for securing the bearing assembly and the housing to the spindle and therefore to the hub.

An axle shaft is positioned within the axle tube and includes splines that are coupled to the external drive splines of the hub. The axle shaft can be substantially solid, substantially hollow or can include a substantially hollow end as will be described in greater detail below with regard to the various exemplary embodiments. Also as will be described, the use of the substantially solid hub spindle provides for a variety of new designs and methods for use and attachment of different types of axle shafts to the hub spindle for transferring torque from the axle shaft to the hub and to the wheel of the vehicle.

For example, in one exemplary embodiment, the axle shaft can have a substantially hollow end or can have a substantially hollow body, wherein a hollow end is positioned within the housing for coupling to the spindle. The hollow end of the axle shaft includes splines positioned within an inner surface of the hollow end that are configured for receiving and engaging with the external or outer drive splines of the hub. The outer drive spines of the hub can be formed on an outer surface of the hub or spindle and in one embodiment, are formed on an outer surface of the inner race. The axle shaft can be press fit or otherwise installed onto the drive splines of the hub.

In some embodiments, a retention mechanism, such as a snap ring, circlip, or pin, can be positioned between the axle shaft and the hub spindle for retaining the axle shaft at a predetermined position in relation to the hub spindle. In such cases, the axle shaft can include an annular groove, such as within the splines, for receiving the retention ring and/or the hub can include an annular groove, such as within a portion of the drive splines, for receiving a portion of the retention ring. In other embodiments such as those using a pin, the axle shaft and hub can include a through hole for receiving and securing a pin. Of course, as known to those skilled in the art, additional retention mechanisms can also be utilized for securing the shaft onto the drive spines of the hub.

In other embodiments, rather than as described about where the hollow end of the axle shaft includes inner splines for coupling to the outer drive splines of the hub, a coupling collar can be installed for coupling the axle shaft to the drive splines and the hub spindle. The coupling collar can therein act to transfer the torque from the axle shaft to the hub. In such embodiments, the axle shaft can be solid, hollow or hollow ended, but would include splines about an outer surface of an end. The coupling collar has inner splines for coupling to the drive splines of the hub and possibly also to the outer splines of the axle shaft. In other embodiments, the coupling collar can have two different sets of splines, one for coupling to the drive splines of the hub and the other for coupling to the outer splines of the axle shaft. In some embodiments, the coupling collar can have two or more diameters, two of which are adapted for coupling appropriately to one of the two sets of splines, e.g., drive splines of the hub and mating splines of the axle shaft.

In these embodiments, the drive splines of the hub can be formed on an outer surface of the inner race as described above, or can be splines formed on the hub spindle itself. In this later embodiment, the coupling collar can be installed on the splines of the hub spindle following attachment of the inner race to the hub spindle. This can also include securing the coupling collar to the hub spindle such as by forming a flange on the end of the hub spindle, for example by roll forming the end of the hub spindle. Such a flange can secure the inner race and, where present, the coupling collar to the hub spindle and therefore securing the bearing assembly and housing to the hub.

As described herein, the improved wheel end assembly as described above can have reduced weight and therefore a reduced diameter while still providing for the transfer of drive torque. The inventors hereof have designed an improved wheel end assembly having a hub spindle that can, in some embodiments, have a reduced diameter, a reduced diameter bearing assembly, and a reduced diameter housing. As such, in some embodiments, the size and weight of the axle and wheel end assemblies can be reduced. Additionally, in some embodiments as will be understood by those skilled in the art, wheel ends according to the present disclosure can eliminate the need for an axle seal within the end of the axle tube. In other embodiments the wheel end as described herein can have improved assembly and reduced manufacturing complexity and costs.

Figure 2:
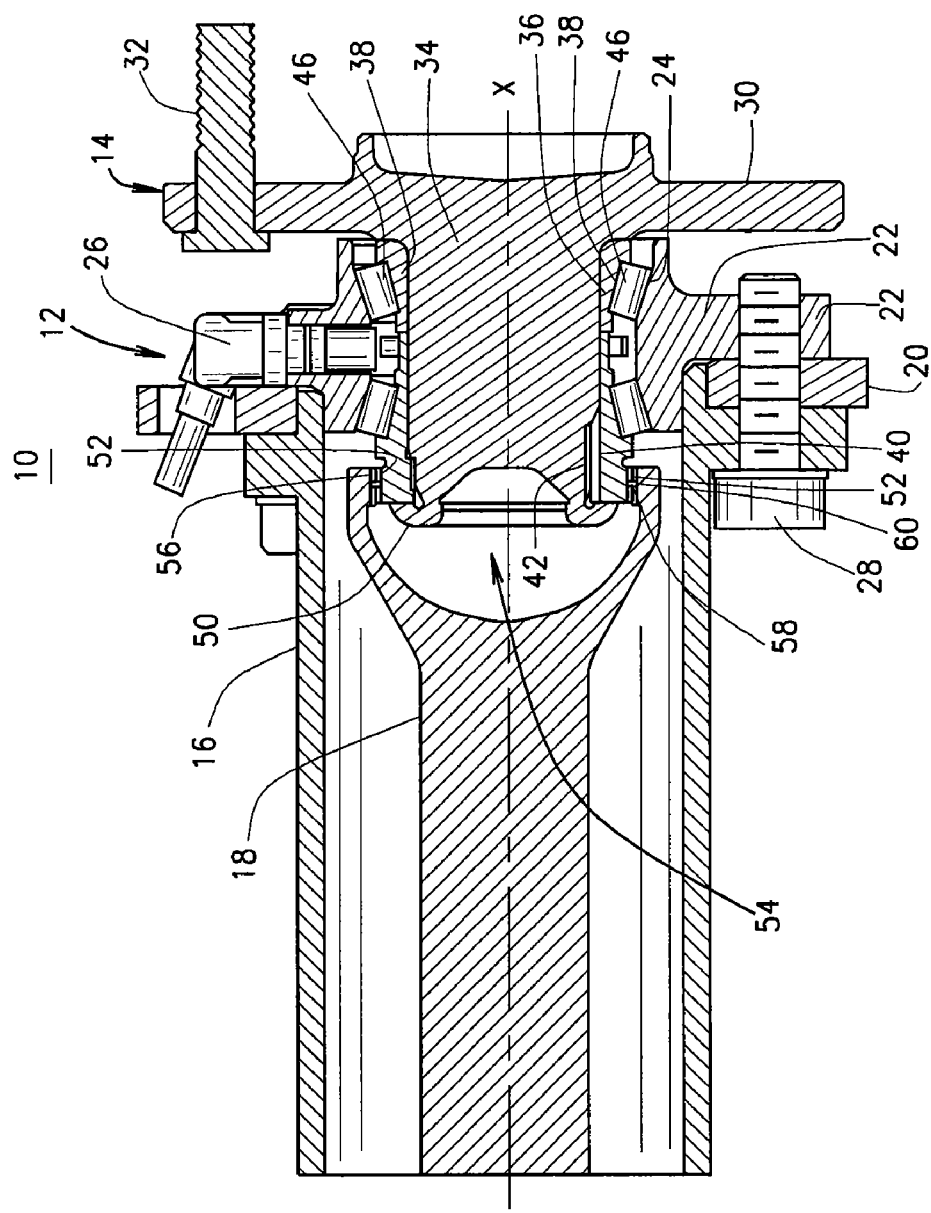
FIG. 2 is a cross sectional side view of a wheel end assembly having a hollow ended axle shaft according to another exemplary embodiment.

These and other embodiments can now be seen by exemplary illustration in the attached figures. The wheel end assemblies 10 of FIGS. 1 and 2 include a housing 12, a hub 14, an axle tube 16 and an axle shaft 18. The housing 12 can include or support a brake plate 20 and an outer race 22 having one or more outer raceways 24. Of course, the housing 12 can include or support other vehicle devices. For example, as shown in FIGS. 1 and 2, an antilock brake system (ABS) sensor 26 can be mounted on the housing 12 in two different positions. The housing 12 is attached to the axle tube 16 via bolts 28 or other similar attachments fixtures or securing means as is known in the art.

The hub 14 includes a driving flange 30 upon which a wheel (not shown) can be mounted using a lug bolt 32. The hub has a spindle 34 that is substantially solid, e.g., not hollow as was heretofore previously used for receiving an end of an axle shaft 18. The substantially solid hub spindle 34 extends into and through the housing 12. An inner race 36 defining an inner raceway 38 is coupled to the hub spindle 34. The hub spindle 34 can include outer splines 40 that can be configured for coupling with inner splines 42 of the inner race 36. The inner race 36 is positioned about the hub spindle 34.

A bearing assembly 44 includes the inner race 36 and its inner raceway 38 and the outer race 22 and its outer raceway 24. Of course, the inner race 36 can have more than one raceway 38 and the outer race 22 can have more than one outer raceway 24. Additionally, rolling elements 46, such as anti-friction bearings as described above, are positioned between the inner race 36 and the outer race 22.

In assembly, the bearing assembly 44 is often assembled with the housing 12. The bearing assembly 44 is then installed on the hub spindle 34, such as by press fitting the inner race 36 of the bearing assembly 44 onto the outer splines 40 of the hub spindle 34 thereby engaging inner splines 42 of the inner race 36 with the outer splines 40. FIG. 1 illustrates the inner splines 42 and outer splines 40 as being about a substantial length of the hub spindle 34 while FIG. 2 illustrates that the inner splines 42 and the outer splines 40 are only proximate to an inboard end of the hub spindle 34 and the inner race 36. These are only two examples of this mating assembly and method and others are considered to also be within the scope of the present disclosure. The inner race 36 can be secured to the hub spindle 34 by a flange 50. The flange 50 can be formed by any method and in some cases can be formed by roll forming an end of the hub spindle 34 following installation of the bearing assembly 44 onto the hub spindle 34.

In the illustrated embodiment of FIGS. 1 and 2, the inner race 36 also includes drive splines 52 about an inboard end of the inner race 36. The axle shaft 18 includes a substantially hollow end 54 having shaft splines 56 that, in this embodiment, are formed on an inner surface of the hollow end 54. As shown the axle shaft 18 as illustrated in FIG. 1 is completely hollow, at least in or proximate to the hub 14. However, the axle shaft 18 could be only hollow about its end and otherwise be solid. The shaft splines 56 are configured for engagement to the drive splines 52 of the hub 14 as provided, in this example, on an outer surface of the inner race 36. Additionally, a retention mechanism herein illustrated as a retention ring 58 can be positioned in an annular groove 60 about the end of the axle shaft 18 for at least partially securing the axle shaft 18 to the hub spindle 34.

In this manner, the axle tube 16 supports the housing 12 and the axle shaft 18 provides for the transfer of torque to the hub 14. The substantially solid spindle 34 can have a substantially reduced diameter as compared to prior wheel end assemblies as the spindle 34 does not have to include a hollow portion with inner splines for receiving a splined-end of a solid axle as was previously required. Additionally, the axle shaft 18 can be solid, partially hollow about an end (as illustrated in FIG. 2) or completely hollow (as illustrated in FIG. 1) thereby allowing for reduction in metal and weight. The attachment of the axle tube 16 to the housing 12 in conjunction with the direct attachment of the axle shaft 18 to the solid spindle 34 can provide a seal to axle fluid contained in the axle tube 16 and about the axle shaft 18. As such, no additional or separate axle tube seal is required within the axle tube 16 proximate to the housing 12 as heretofore been required. This also provides another reduction in the weight and eliminates a step in the wheel end assembly process.

Figure 3:
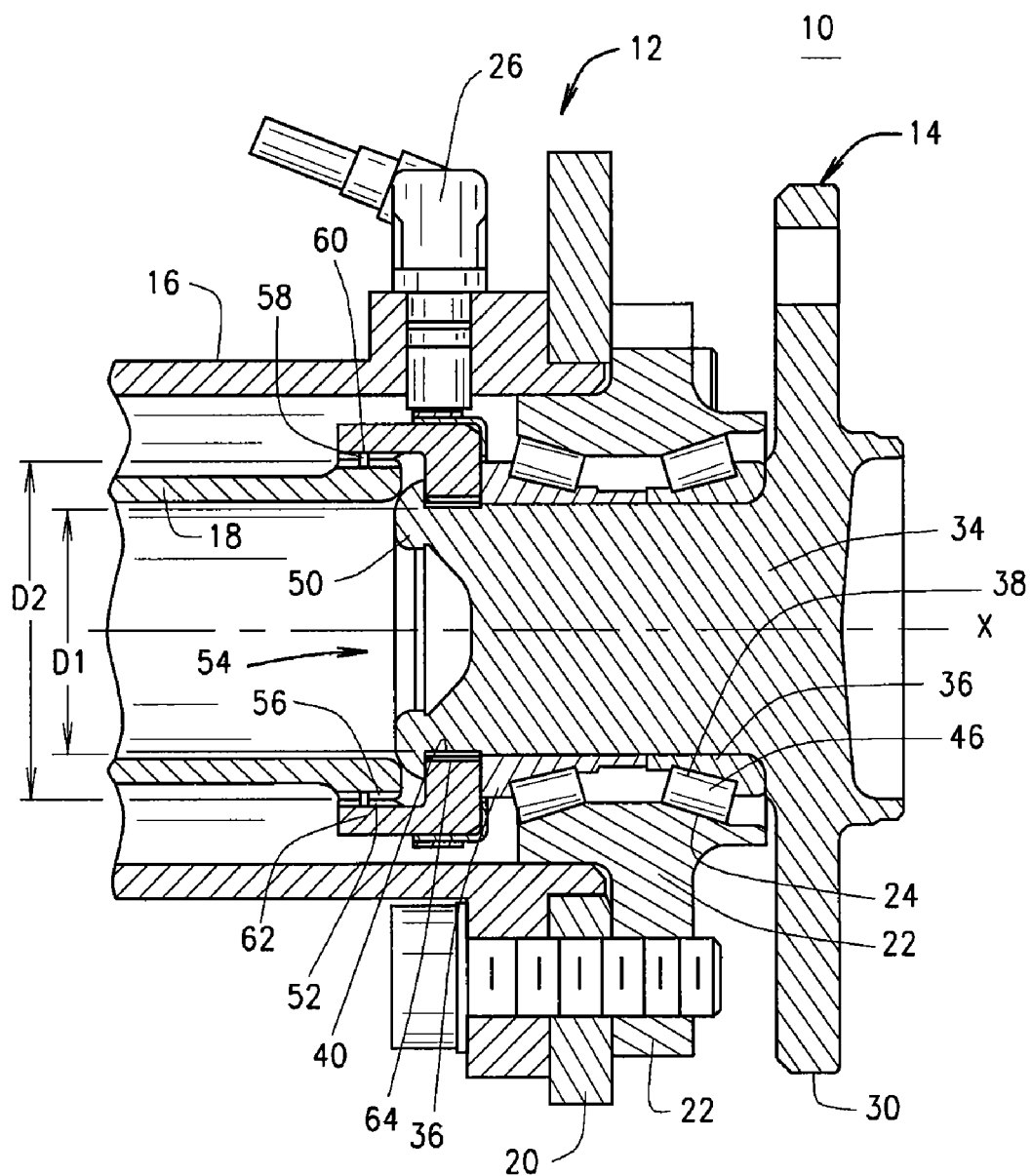
FIG. 3 is a cross sectional side view of a wheel end assembly having a substantially hollow axle shaft and a two-diameter coupling collar according to yet another exemplary embodiment.
Figure 4:
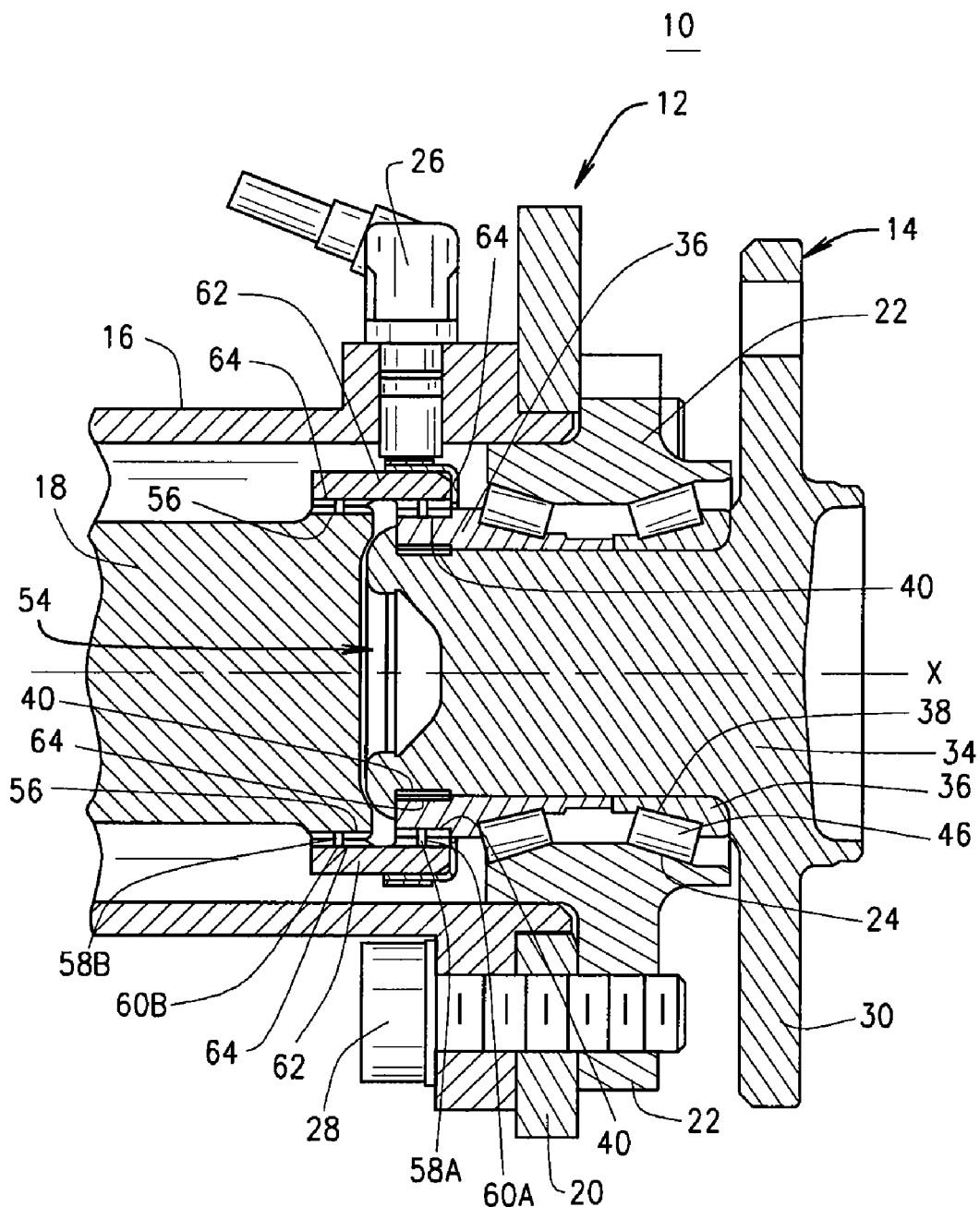
FIG. 4 is a cross sectional side view of a wheel end assembly having a hollow ended axle shaft and a single-diameter coupling collar according to still another exemplary embodiment.

FIGS. 3 and 4 illustrates another exemplary embodiment of a wheel end 10. Similar components as described above also apply to these embodiments. However, in these embodiments, a coupling collar 62 has inner splines 64 for attaching the coupling collar 62 to the outer splines 40 of the hub spindle 34. The coupling collar 62 includes drive splines 52 on an inner surface for engaging the shaft splines 56. As shown, the coupling collar 62 has a first diameter D1 dimensioned for attachment to the hub spindle 34 such as by press fitting the inner splines 64 to the outer splines 40. The flange 50 is formed to secure not only the inner race 36 to the hub spindle 34, but also the coupling collar 62. The coupling collar 62 also includes a second diameter D2 that is greater than the first diameter D1. The drive splines 52 on the inner surface of the second diameter D2 engage the shaft splines 56 of the axle shaft 18.

Additionally, as described above the coupling collar 62 can also be attached to the axle shaft 18 by means of a retention mechanism such as a pin or retaining clip or ring 58 (shown as 58A and 58B in FIGS. 3 and 4). FIG. 3 illustrates an embodiment have a hollow axle shaft 18. However, the axle shaft 18 can also be solid or only have a hollow end 54.

FIG. 4 illustrates another embodiment wherein the inner race 36 includes the drive splines 52. The collar 62 includes inner splines 64 that couple to the drive splines 52 of the inner race 36 and to the shaft splines 56 of the axle shaft 18. Also as illustrated herein, more than one retention mechanism can be utilized. As shown, a first retention ring 58A is positioned in a first annular groove 60A for securing the coupling collar 62 about the drive splines 52 of the inner race 36. A second retention ring 58B is positioned in a second annular groove 60B for securing the coupling collar 62 about the shaft splines 56 of the axle shaft 18. Of course, those skilled in the art will understand that other retention mechanisms are also possible and considered to be within the scope of this disclosure.

As can be understood by those skilled in the art after reviewing the figures and the above description, it should be understood that in other embodiments the present disclosure includes improved methods for assembling a wheel end assembly for a vehicle. This can include assembling a wheel housing and bearing assembly that includes installing roller elements between an outer race defining an outer raceway and an inner race defining an inner raceway and installing the housing onto a substantially solid spindle of a wheel hub. The installing includes press fitting the inner race onto external splines of the hub spindle. The method also includes forming a flange on an end of the spindle wherein the formed flange secures the inner race, the bearing assembly and the housing onto hub spindle. The method further includes attaching an axle shaft to drive splines located on an outer surface of the installed housing and spindle assembly and attaching an end of an axle tube to the housing including surrounding that attached axle shaft.

As noted above with regard to the exemplary embodiments of FIGS. 1 and 2, the assembly methods can also include attaching the axle shaft to drive splines by inserting an end of the spindle into a hollow end of the axle shaft having inner splines configured for mating with the drive splines.

Additionally, in other exemplary embodiments such as those of FIGS. 3 and 4, the method can include attaching a coupling collar having internal splines to the external drive splines and to splines on an outer surface of the axle shaft. This can also include press fitting or otherwise attaching a coupling collar having first inner splines onto external splines of the hub spindle following press fitting of the inner race thereto and before forming of the flange such that the flange secures the coupling collar to the hub spindle. This can also include inserting an end of the drive shaft having outer splines into a portion of the coupling collar having second inner splines and then coupling the splines of the drive shaft to the second inner splines of the coupling collar. Of course those skilled in the art can understand by the teachings of this disclosure that additional assembly methods and steps are also possible.

It should now be clear that the various embodiments, some of which are illustrated by example herein, provide a different and improved wheel end assembly for vehicles. In various embodiments, one or more benefits can be provided. These can include one or more of the following, by way of example. A reduction in the size of the hub spindle and therefore its weight, a reduction in the diameter of the hub spindle, the inner race, the bearing assembly and the outer race and roller elements, the use of a hollow, substantially hollow or hollow ended axle shaft within the axle tube, and the elimination of the axle tube seal for sealing axle fluid from the wheel end. Of course those skilled in the art will understand after reviewing the teachings of this disclosure that other benefits, including those associated with assembly, and material costs are also provided.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

What is claimed is:

1. A wheel end assembly for a vehicle comprising:
an axle tube;
a housing secured to the end of the axle tube;
a hub having a drive flange located axially outward from the housing and a spindle projecting from the drive flange into the housing, the hub spindle having a substantially solid body, and the hub having drive splines about an external surface;
rolling elements located between the hub spindle and the housing for enabling the hub to rotate about an axis, wherein the hub includes an inner race defining an inner raceway located around and carried by the hub spindle for engagement with the rolling elements; and
an axle shaft having splines positioned within the axle tube, the splines of the axle shaft being coupled to the external drive splines of the hub, wherein the axle shaft includes a substantially hollow end positioned within the housing having the shaft splines positioned within an inner surface of the hollow end of the axle shaft, wherein the hollow end is configured for receiving a portion of the hub for coupling the shaft splines with the drive splines of the hub for transferring torque from the axle shaft to the hub.

2. The assembly of claim 1 wherein the axle shaft has a body that is hollow about a substantial length of axle shaft including the hollow end.

3. The assembly of claim 2, further comprising a retention mechanism positioned between the axle shaft and the hub spindle for retaining the axle shaft at a predetermined position in relation to the hub spindle.

4. The assembly of claim 3 wherein the retention mechanism is a retention ring and wherein the axle shaft includes an annular groove within the splines for receiving a first portion of the retention ring and wherein the hub includes an annular groove within a portion of the drive splines for receiving a second portion of the retention ring.

5. The assembly of claim 1 wherein the hub spindle includes outer splines about a peripheral surface and wherein the inner race has splines about an inner surface that are coupled to the outer splines of the hub spindle for fixedly coupling the inner race about the hub spindle, the inner race defining at least a portion of the inner raceway.

6. The assembly of claim 5 wherein the drive splines of the hub are formed about an outer surface of an end portion of the inner race and wherein the hub spindle includes a flange formed at an inboard end, the flange configured for securing the inner race to the hub spindle.

7. The assembly of claim 1 wherein the rolling elements are selected from the group of consisting of ball bearings, roller bearings, ball thrust bearings, roller thrust bearings, tapered roller bearings, and spherical roller bearings.

8. The assembly of claim 1 wherein the hub includes an inner race defining an inboard inner raceway and an outboard inner raceway and the housing includes an inboard outer raceway and an outboard outer raceway, and wherein there are outboard rolling elements positioned between the inner and outer outboard raceways and inboard rolling elements positioned between the inner and outer inboard raceways, and wherein the rolling elements are tapered roller bearings.

9. A wheel end assembly for a vehicle comprising:
an axle tube;
a housing secured to the end of the axle tube and having an outer race defining an outer raceway;
a hub having a drive flange located axially outward from the housing, a spindle having a substantially solid body projecting from the drive flange into the housing and having splines about an outer surface, and an inner race defining an inner raceway and having splines about an inner surface for coupling with the outer splines of the hub spindle and drive splines about an outer surface of an inboard end;
rolling elements located between the inner raceway of the hub spindle and the outer raceway of the housing for enabling the hub to rotate about an axis; and
an axle shaft positioned within the axle tube, the axle shaft having a hollow end defining inner splines, the inner splines of the axle shaft coupled about and to the drive splines of the inner race for transferring torque from the axle shaft to the hub.

10. The assembly of claim 9 wherein the axle shaft has a body that is hollow about a substantial length of axle shaft including the hollow end.

11. The assembly of claim 10, further comprising a retention mechanism positioned between the axle shaft and the hub spindle for retaining the axle shaft at a predetermined position in relation to the hub spindle.

12. The assembly of claim 11 wherein the retention mechanism is a retention ring and wherein the axle shaft includes an annular groove within the splines for receiving a first portion of the retention ring and wherein the hub includes an annular groove within a portion of the drive splines for receiving a second portion of the retention ring.

13. The assembly of claim 9 wherein the rolling elements are selected from the group of consisting of ball bearings, roller bearings, ball thrust bearings, roller thrust bearings, tapered roller bearings, and spherical roller bearings.

14. The assembly of claim 9 wherein the inner race of the hub includes an inboard inner raceway and an outboard inner raceway and the housing includes an inboard outer raceway and an outboard outer raceway, and wherein there are outboard rolling elements positioned between the inner and outer outboard raceways and inboard rolling elements positioned between the inner and outer inboard raceways, and wherein the rolling elements are tapered roller bearings.

15. A wheel end assembly for a vehicle comprising:
an axle tube;
a housing secured to the end of the axle tube;
a hub having a drive flange located axially outward from the housing and a spindle projecting from the drive flange into the housing, the hub spindle having a substantially solid body, and the hub having drive splines about an external surface;
rolling elements located between the hub spindle and the housing for enabling the hub to rotate about an axis; and
an axle shaft having splines positioned within the axle tube, the splines of the axle shaft being coupled to the external drive splines of the hub, the axle shaft includes a substantially hollow end positioned within the housing having the shaft splines positioned within an inner surface of the hollow end of the axle shaft and is hollow about a substantial length of axle shaft including the hollow end, wherein the hollow end is configured for receiving a portion of the hub for coupling the shaft splines with the drive splines of the hub for transferring torque from the axle shaft to the hub, and wherein the hub includes an inner race defining an inner raceway located around and carried by the hub spindle for engagement with the rolling elements.

16. The assembly of claim 15, further comprising a retention mechanism positioned between the axle shaft and the hub spindle for retaining the axle shaft at a predetermined position in relation to the hub spindle.

17. The assembly of claim 16 wherein the retention mechanism is a retention ring and wherein the axle shaft includes an annular groove within the splines for receiving a first portion of the retention ring and wherein the hub includes an annular groove within a portion of the drive splines for receiving a second portion of the retention ring.

18. The assembly of claim 15 wherein the rolling elements are selected from the group of consisting of ball bearings, roller bearings, ball thrust bearings, roller thrust bearings, tapered roller bearings, and spherical roller bearings.

19. The assembly of claim 15 wherein the hub includes an inner race defining an inboard inner raceway and an outboard inner raceway and the housing includes an inboard outer raceway and an outboard outer raceway, and wherein there are outboard rolling elements positioned between the inner and outer outboard raceways and inboard rolling elements positioned between the inner and outer inboard raceways, and wherein the rolling elements are tapered roller bearings.

20. A wheel end assembly for a vehicle comprising:
an axle tube;
a housing secured to the end of the axle tube;
a hub having a drive flange located axially outward from the housing and a spindle projecting from the drive flange into the housing, the hub spindle having a substantially solid body, and the hub having drive splines about an external surface;
rolling elements located between the hub spindle and the housing for enabling the hub to rotate about an axis, wherein the hub includes an inner race defining an inner raceway located around and carried by the hub spindle for engagement with the rolling elements, wherein the hub spindle includes outer splines about a peripheral surface and wherein the inner race has splines about an inner surface that are coupled to the outer splines of the hub spindle for fixedly coupling the inner race about the hub spindle, the inner race defining at least a portion of the inner raceway; and
an axle shaft having splines positioned within the axle tube, the splines of the axle shaft being coupled to the external drive splines of the hub, wherein the axle shaft includes a substantially hollow end positioned within the housing having the shaft splines positioned within an inner surface of the hollow end of the axle shaft, wherein the hollow end is configured for receiving a portion of the hub for coupling the shaft splines with the drive splines of the hub for transferring torque from the axle shaft to the hub.

21. The assembly of claim 20 wherein the drive splines of the hub are formed about an outer surface of an end portion of the inner race and wherein the hub spindle includes a flange formed at an inboard end, the flange configured for securing the inner race to the hub spindle.

22. The assembly of claim 20 wherein the rolling elements are selected from the group of consisting of ball bearings, roller bearings, ball thrust bearings, roller thrust bearings, tapered roller bearings, and spherical roller bearings.

23. The assembly of claim 20 wherein the hub includes an inner race defining an inboard inner raceway and an outboard inner raceway and the housing includes an inboard outer raceway and an outboard outer raceway, and wherein there are outboard rolling elements positioned between the inner and outer outboard raceways and inboard rolling elements positioned between the inner and outer inboard raceways, and wherein the rolling elements are tapered roller bearings.

* * * * *